(No Model.)
J. W. WOODRUFF.
VELOCIPEDE.
No. 293,837. Patented Feb. 19, 1884.
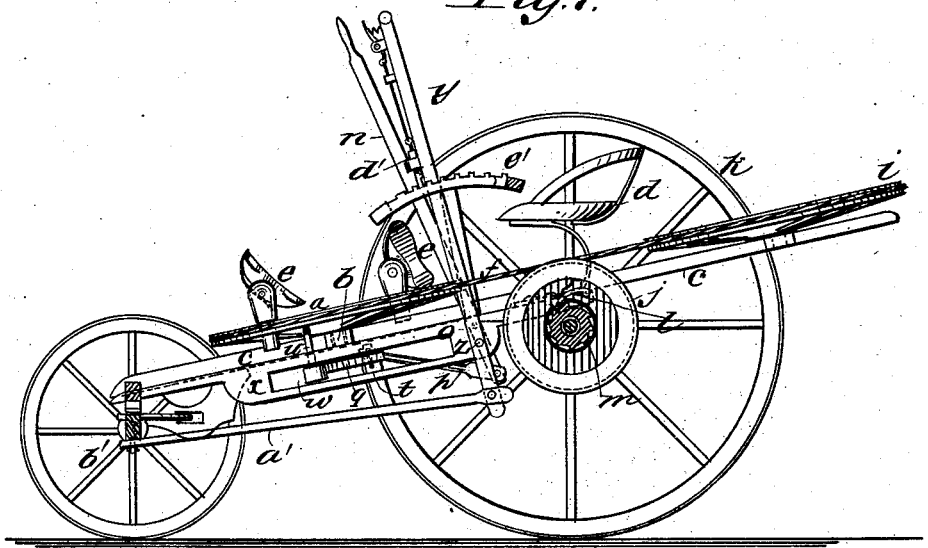
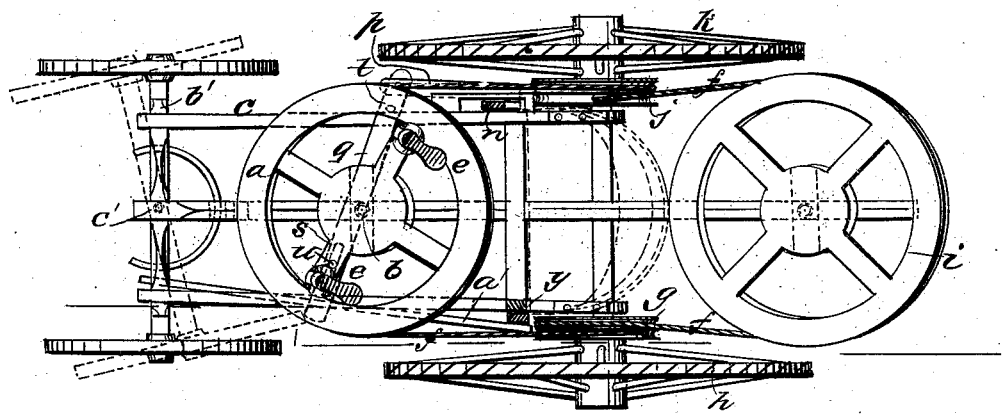
WITNESSES:
Francis McArdle,
C. Sedgwick
INVENTOR:
J. W. Woodruff
BY Munn & Co
ATTORNEYS.

UNITED STATES PATENT OFFICE.

JOHN WESLEY WOODRUFF, OF WISE, WEST VIRGINIA.

VELOCIPEDE.

SPECIFICATION forming part of Letters Patent No. 293,837, dated February 19, 1884.

Application filed July 18, 1883. (No model.)

*To all whom it may concern:*

Be it known that I, JOHN W. WOODRUFF, of Wise, in the county of Monongalia and State of West Virginia, have invented a new and Improved Propelling Apparatus for Road-Vehicles, of which the following is a full, clear, and exact description.

My invention consists of foot-power apparatus contrived to apply the power by ratchet-and-pawl mechanisms to the driving-wheels by oscillating a horizontal tread-wheel with the feet, said tread-wheel being located in front of the driver's seat, and connected with ratchet-hubs on the axle by an endless belt passing around said hubs, and around a reversing-wheel, so that the ratchet of one hub drives ahead, while the ratchet of the other hub reverses, and a hand-lever contrivance is combined with the tread-wheel for combining foot and hand power in the propulsion of the vehicles, making a simple and efficient means for propelling light vehicles, all as hereinafter fully described.

Reference is to be had to the accompanying drawings, forming part of this specification, in which similar letters of reference indicate corresponding parts in both the figures.

Figure 1 is a longitudinal sectional elevation of my improved road-vehicle, and Fig. 2 is partly a plan view and partly a horizontal section.

I arrange a tread-wheel, $a$, on an axis, $b$, perpendicular to the bed-frame $c$ of a three or four wheel vehicle, and locate said wheel $a$ suitable distance in front of the operator's seat $d$, to enable him to impart oscillating motion to said wheel by the foot acting on the treadles $e$, pivoted on the upper side of the wheel, and on opposite side of the axis of said wheel. The bed-frame is arranged to descend from rear to front suitably to allow the legs of the operator to incline the requisite amount for comfortable action. An endless cord, $f$, is arranged in the grooved periphery of this oscillating tread-wheel, and passes around ratchet-drum $g$, fitted on driving-wheel $h$, thence around the reversing-wheel $i$, located at the back of the bed-frame, and back around ratchet-drum $j$, fitted on driving-wheel $k$, and back onto tread-wheel $a$. The ratchet-drums have pawls $l$, that engage with ratchet-hubs $m$ on the axle when moving forward, so that the oscillating movements of the tread-wheel will impart continuous driving action by the alternate action of the pawls.

To enable hand-power to be also used in combination with the foot-power thus applied, I have arranged the hand-lever $n$ on the right-hand side of the machine, to turn on a pivot, $o$, and being connected by a rod, $p$, with a lever, $q$, that is pivoted at $t$ to the bed-frame, and connected to the stud-pin $u$ of the tread-wheel, so that the power of the hand may be applied to said wheel by pushing and pulling the lever forward and backward at the same time that the feet are employed, thus utilizing the whole capacity of the operator. The lever $q$ has a slot, $s$, in which the stud-pin $u$ of the tread-wheel works, and said lever plays in a slot, $w$, of a cleat, X, attached to the under side of the bed-frame for a guide to said lever.

The steering-gear consists of the hand-lever $y$, fixed on a pivot, $z$, at the left side of the bed-frame near the operator's seat, and connected by a rod, $a'$, with the front axle, $b'$, which turns on the usual king-bolt, $c'$, so as to be turned either to the right or left, according as the lever is shifted forward or backward. Said lever is provided with a latch, $d'$, and notched bar $e'$, to hold it in any desired position. The tread and reversing wheels $a$ $i$ are arranged in an inclined plane, and in such relation and at right angles to the ratchet-drums that the operator can advantageously apply power for operating the apparatus.

I do not abandon or dedicate to the public any patentable feature set forth herein and not hereinafter claimed, but reserve the right to claim the same either in a reissue of any patent that may be granted upon this application or in any other applications for Letters Patent I may make.

Having thus described my invention, I claim as new and desire to secure by Letters Patent—

1. The combination of the tread-wheel $a$, endless cord $f$, ratchet-drums $g$ $j$, and the reversing-wheel $i$ with the driving-wheels $h$ and $k$ of a road-vehicle, said tread-wheel being arranged with relation to the driver's seat, the ratchet-drums arranged with relation to the driving-wheels, and the reversing-wheel arranged on the rear of the bed-frame and in the plane of the tread-wheel $a$, substantially as described.

2. The combination of the hand-lever $n$ with the tread-wheel $a$, said tread-wheel being arranged with relation to the driver's seat, and geared with the driving-wheels, substantially as described.

3. The steering-lever $y$, arranged on the left-hand side of the bed-frame, and connected with the front axle by a rod, $a'$, in a road-vehicle having propelling mechanism consisting of tread-wheel $a$, geared, substantially as described, with the driving-wheels, and having a hand-lever, $n$, combined with it, and located on the right-hand side of said bed-frame, substantially as herein specified.

JOHN WESLEY WOODRUFF.

Witnesses:
M. J. LANTZ,
JAS. S. MORRIS.